United States Patent
Kang et al.

(10) Patent No.: US 12,330,611 B2
(45) Date of Patent: Jun. 17, 2025

(54) ELECTRICAL PARKING BRAKE SYSTEM AND CONTROL METHOD THEREOF

(71) Applicants: Hyundai Motor Company, Seoul (KR); Kia Corporation, Seoul (KR)

(72) Inventors: Wei Kang, Yantai (CN); Young Jin Jo, Suwon-Si (KR); Maolin Qu, Yantai (CN)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 72 days.

(21) Appl. No.: 18/537,519

(22) Filed: Dec. 12, 2023

(65) Prior Publication Data

US 2024/0375622 A1    Nov. 14, 2024

(30) Foreign Application Priority Data

May 8, 2023   (CN) .......................... 202310511228.6

(51) Int. Cl.
  *B60T 8/17*       (2006.01)
  *B60T 7/12*       (2006.01)
  (Continued)

(52) U.S. Cl.
  CPC .................... *B60T 8/17* (2013.01); *B60T 7/12* (2013.01); *B60T 13/741* (2013.01); *B60T 17/22* (2013.01);
  (Continued)

(58) Field of Classification Search
  CPC ... B60T 7/12; B60T 8/17; B60T 13/74; B60T 13/741; B60T 13/746; B60T 17/22;
  (Continued)

(56) References Cited

U.S. PATENT DOCUMENTS 11,305,747 B1 *   4/2022   Lee .................. B60T 13/662
2001/0023799 A1 *  9/2001   Engelhard ............ B60T 13/74
                                                  303/10
(Continued)

FOREIGN PATENT DOCUMENTS

| CN | 107757593 A | 3/2018 |
|----|-------------|--------|
| CN | 109677388 A | 4/2019 |
| CN | 112406842 A | 2/2021 |

*Primary Examiner* — John M Zaleskas
(74) *Attorney, Agent, or Firm* — Morgan, Lewis & Bockius LLP

(57) ABSTRACT

In an electrical parking brake system and a control method thereof, the electrical parking brake system includes: a vehicle control unit electrically connected to a shift by wire of a vehicle, and configured to receive a shift command entered by a driver from the shift by wire, and periodically transmitting a parking request signal at a predetermined transmission time interval; a main parking brake controller electrically connected to the vehicle control unit through a first communication channel and a second communication channel, and configured to execute a main parking brake control based on the parking request signal received from the vehicle control unit; and an auxiliary parking brake controller electrically connected to the vehicle control unit through the first communication channel and a third communication channel, and configured to execute an auxiliary parking brake control based on the parking request signal received from the vehicle control unit.

20 Claims, 3 Drawing Sheets

(51) Int. Cl.
  *B60T 13/74* (2006.01)
  *B60T 17/22* (2006.01)
(52) U.S. Cl.
  CPC ....... *B60T 13/746* (2013.01); *B60T 2270/402* (2013.01); *B60T 2270/406* (2013.01); *B60T 2270/413* (2013.01)
(58) Field of Classification Search
  CPC ......... B60T 2270/402; B60T 2270/406; B60T 2270/413; H04L 12/46; H04L 2012/40215; H04L 2012/40273
  See application file for complete search history.

(56) References Cited

U.S. PATENT DOCUMENTS

| | | | | |
|---|---|---|---|---|
| 2010/0299035 A1* | 11/2010 | Maron | ................. | B60T 13/746 |
| | | | | 188/106 P |
| 2012/0145490 A1* | 6/2012 | Clary | ................... | B60T 8/1703 |
| | | | | 188/106 P |
| 2017/0166173 A1* | 6/2017 | Lauffer | ................. | B60T 13/662 |
| 2018/0236974 A1* | 8/2018 | Kubb | ....................... | B60T 17/22 |
| 2018/0328430 A1* | 11/2018 | Feigel | ................... | B60T 13/746 |
| 2019/0168724 A1* | 6/2019 | VandenBerg, III | ...... | B60T 8/171 |
| 2019/0168730 A1* | 6/2019 | Park | ....................... | G07C 5/0808 |
| 2019/0176789 A1* | 6/2019 | Frenzel | ................. | B60T 13/745 |
| 2020/0055506 A1* | 2/2020 | Michels | ................. | B60T 13/74 |
| 2020/0070788 A1* | 3/2020 | Michels | ................. | B60T 7/085 |
| 2020/0369253 A1* | 11/2020 | Shah | ..................... | B60T 13/662 |
| 2020/0406869 A1* | 12/2020 | Hwang | .................. | B60T 17/22 |
| 2022/0194344 A1* | 6/2022 | Tarandek | .................. | B60T 8/17 |
| 2022/0289162 A1* | 9/2022 | Lee | ........................ | B60T 13/686 |
| 2022/0314953 A1* | 10/2022 | Brok | ..................... | B60T 13/745 |
| 2022/0324425 A1* | 10/2022 | Kim | ........................ | B60T 8/885 |
| 2022/0388487 A1* | 12/2022 | Hwang | .................. | B60T 7/12 |
| 2022/0396249 A1* | 12/2022 | Lee | ........................ | B60T 17/22 |
| 2023/0042441 A1* | 2/2023 | Fujita | .................... | B60T 13/741 |
| 2023/0070909 A1* | 3/2023 | Takimoto | ................ | F16D 65/183 |
| 2023/0129690 A1* | 4/2023 | Lee | ........................ | B60T 8/885 |
| | | | | 701/34.4 |
| 2023/0192048 A1* | 6/2023 | Moon | ....................... | B60T 1/10 |
| | | | | 701/22 |
| 2023/0339447 A1* | 10/2023 | Ha | ........................ | B60T 13/745 |
| 2024/0101088 A1* | 3/2024 | Nam | ....................... | B60T 8/94 |
| 2024/0149847 A1* | 5/2024 | Akourtam | ................ | B60T 7/08 |
| 2025/0058747 A1* | 2/2025 | Kim | ........................ | B60T 8/172 |
| 2025/0091554 A1* | 3/2025 | Jing | ......................... | B60T 7/22 |

\* cited by examiner

ELECTRICAL PARKING BRAKE SYSTEM AND CONTROL METHOD THEREOF

CROSS-REFERENCE TO RELATED APPLICATION

The present application claims priority to and the benefit of Chinese Patent Application No. 202310511228.6 filed in the Chinese National Intellectual Property Administration on May 8, 2023, the entire contents of which is incorporated herein for all purposes by this reference.

BACKGROUND OF THE PRESENT DISCLOSURE

Field of the Present Disclosure

The present disclosure relates to a field of brake control of a vehicle, and more particularly to an electrical parking brake system and a control method thereof.

Description of Related Art

An Electrical Parking Brake (EPB) is a technology that implements a parking brake through electrical control. In the global electric vehicle market, more and more vehicle manufacturers have eliminated a traditional P-gear sprag and realized a P-gear parking using an EPB operation. Eliminating the P-gear sprag inevitably increases the risk of safety incidents. For example, when an EPB Electronic Control Unit (ECU) fails, the vehicle cannot execute the parking brake function and thus cannot meet the safety requirements for fully loaded parking on a ramp with an 8% slope stipulated by related laws and regulations.

Currently, an EPB systems of some mainstream vehicle manufacturers use a two-box method. According to the two-box method, an electronic booster (i-Booster) and an electric vehicle stability control (ESC) system are divided into two independent modules, and an EPB software is integrated into each of the two modules to realize the fail-safe protection of the P-gear parking. However, for electrically controlled braking systems with one-box (that is, Integrated Electric Brake (IEB)) method, the EPB ECU with an integrated EPB software needs be added separately to prevent P-gear parking failures. However, when the EPB ECU is added solely, hardware costs and the size of the EPB system are increased.

The information included in this Background in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a technique that can improve the fail-safe performance of an EPB system without significantly increasing hardware cost and without increasing a bulk of the EPB system.

Various aspects of the present disclosure are directed to providing an electrical parking brake system including: a vehicle control unit electrically connected to a shift by wire of a vehicle, and configured to receive a shift command entered by a driver from the shift by wire, and periodically transmitting a parking request signal at a predetermined transmission time interval: a main parking brake controller electrically connected to the vehicle control unit through a first communication channel and a second communication channel, and configured to execute a main parking brake control based on the parking request signal received from the vehicle control unit; and an auxiliary parking brake controller electrically connected to the vehicle control unit through the first communication channel and a third communication channel, and configured to execute an auxiliary parking brake control based on the parking request signal received from the vehicle control unit.

The main parking brake controller is integrated into an integral electrical brake unit of the vehicle, and the auxiliary parking brake controller may be integrated into a motor control unit of the vehicle.

The first communication channel includes a first CAN local area network of a CAN network, the second communication channel may include a second CAN local area network, a third CAN local area network, and a central gateway of the CAN network, and the third communication channel may be a communication channel based on a hardwired connection.

The vehicle control unit is further configured to: when the shift command entered by the driver is received, transmit the parking request signal to the main parking brake controller through the first communication channel and the second communication channel to cause the main parking brake controller to execute the main parking brake control, and periodically receive a main parking brake status feedback signal from the main parking brake controller at a predetermined reception time interval.

The vehicle control unit is further configured to: when the main parking brake status feedback signal is not received from the main parking brake controller within the predetermined reception time interval, determine that a communication failure has occurred in both the first communication channel and the second communication channel, and transmit the parking request signal to the auxiliary parking brake controller through the third communication channel and activate the auxiliary parking brake controller to cause the auxiliary parking brake controller to execute the auxiliary parking brake control.

The vehicle control unit is further configured to: when the main parking brake status feedback signal is received from the main parking brake controller within the predetermined reception time interval, determine that at least one of the first communication channel and the second communication channel is in a normal state, and maintain the transmission of the parking request signal to the main parking brake controller through both the first communication channel and the second communication channel.

The main parking brake controller is further configured to: when the parking request signal is received from the vehicle control unit, determine whether the main parking brake control is executable, and when it is determined that the main parking brake control cannot be executed, transmit an auxiliary parking brake mode request signal to the auxiliary parking brake controller through the first communication channel and activate the auxiliary parking brake controller.

The vehicle control unit is further configured to: when the auxiliary parking brake controller is activated, transmit the parking request signal to the auxiliary parking brake controller through the first communication channel to cause the auxiliary parking brake controller to execute the auxiliary parking brake control, receive an auxiliary parking brake status feedback signal from the auxiliary parking brake controller periodically at the predetermined reception time interval, and when the auxiliary parking brake status feedback signal is received from the auxiliary parking brake controller within the predetermined reception time interval, determine that the first communication channel is in a normal state, and cause the auxiliary parking brake controller to maintain the execution of the auxiliary parking brake control.

The vehicle control unit is further configured to: when the auxiliary parking brake status feedback signal is not received from the auxiliary parking brake controller within the predetermined reception time interval, determine that the communication failure has occurred in the first communication channel, and transmit the parking request signal to the auxiliary parking brake controller through the third communication channel and activate the auxiliary parking brake controller to cause the auxiliary parking brake controller to execute the auxiliary parking brake control.

The main parking brake controller is further configured to: when the parking request signal is received from the vehicle control unit, determine whether the main parking brake control is executable, and when it is determined that the main parking brake control is executable, control operations of first and second calipers to execute the main parking brake control, and after the main parking brake control is completed, transmit a main parking brake status feedback signal indicating that main parking brake control has been completed to the vehicle control unit.

The auxiliary parking brake controller is configured to: execute the auxiliary parking brake control by controlling an operation of only one caliper, and after the auxiliary parking brake control is completed, transmit an auxiliary parking brake status feedback signal indicating that the auxiliary parking brake control is completed to the vehicle control unit.

Another aspect exemplary embodiment of the present disclosure provides a control method of an electrical parking brake system, the electrical parking brake system including a vehicle control unit, a main parking brake controller, and an auxiliary parking brake controller, the main parking brake controller being electrically connected to the vehicle control unit through a first communication channel and a second communication channel, and the auxiliary parking brake controller being electrically connected to the vehicle control unit through the first communication channel and the third communication channel. The control method includes: receiving, by the vehicle control unit, a shift command entered by a driver from a shift by wire, and periodically transmitting a parking request signal at a predetermined transmission time interval: executing, by the main parking brake controller, a main parking brake control based on the parking request signal received from the vehicle control unit; and executing, by the auxiliary parking brake controller, an auxiliary parking brake control based on the parking request signal received from the vehicle control unit.

The main parking brake controller is integrated into an integral electrical brake unit of the vehicle, and the auxiliary parking brake controller is integrated into a motor control unit of the vehicle, and the first communication channel includes a first CAN local area network of a CAN network, the second communication channel includes a second CAN local area network, a third CAN local area network, and a central gateway of the CAN network, and the third communication channel is a communication channel based on a hardwired connection.

When the shift command entered by the driver is received, the vehicle control unit is configured to transmit the parking request signal to the main parking brake controller through both the first communication channel and the second communication channel to cause the main parking brake controller to execute the main parking brake control, and periodically receives a main parking brake status feedback signal from the main parking brake controller at a predetermined reception time interval.

When the main parking brake status feedback signal is not received from the main parking brake controller within the predetermined reception time interval, the vehicle control unit is configured to determine that a communication failure has occurred in both the first communication channel and the second communication channel, and transmits the parking request signal to the auxiliary parking brake controller through the third communication channel and activates the auxiliary parking brake controller to cause the auxiliary parking brake controller to execute the auxiliary parking brake control.

When the main parking brake status feedback signal is received from the main parking brake controller within the predetermined reception time interval, the vehicle control unit determine that at least one of the first communication channel and the second communication channel is in a normal state, and maintains the transmission of the parking request signal to the main parking brake controller through both the first communication channel and the second communication channel.

When the parking request signal is received from the vehicle control unit, the main parking brake controller is configured to determine whether the main parking brake control is executable, and when it is determined that the main parking brake control cannot be executed, the main parking brake controller is configured to transmit an auxiliary parking brake mode request signal to the auxiliary parking brake controller through the first communication channel to activate the auxiliary parking brake controller, and the vehicle control unit is configured to transmit the parking request signal to the auxiliary parking brake controller through the first communication channel to cause the auxiliary parking brake controller to execute the auxiliary parking brake control, the vehicle control unit is configured to receive an auxiliary parking brake status feedback signal from the auxiliary parking brake controller periodically at the predetermined reception time interval, and when the auxiliary parking brake status feedback signal is received from the auxiliary parking brake controller within the predetermined reception time interval, the vehicle control unit is configured to determine that the first communication channel is in a normal state, and causes the auxiliary parking brake controller to maintain the execution of the auxiliary parking brake control.

When the auxiliary parking brake status feedback signal is not received from the auxiliary parking brake controller within the predetermined reception time interval, the vehicle control unit is configured to determine that the communication failure has occurred in the first communication channel, and transmits the parking request signal to the auxiliary parking brake controller through the third communication channel and activates the auxiliary parking brake controller to cause the auxiliary parking brake controller to execute the auxiliary parking brake control.

When the parking request signal is received from the vehicle control unit, the main parking brake controller is configured to determine whether the main parking brake control is executable: when it is determined that the main parking brake control is executable, the main parking brake controller is configured to control operations of first and second calipers to execute the main parking brake control; and after the main parking brake control is completed, the main parking brake controller is configured to transmit the main parking brake status feedback signal indicating that the main parking brake control is completed to the vehicle control unit.

The auxiliary parking brake controller is configured to execute the auxiliary parking brake control by controlling an operation of only one caliper, and after the auxiliary parking brake control is completed, the auxiliary parking brake controller is configured to transmit an auxiliary parking brake status feedback signal indicating that the auxiliary parking brake control is completed to the vehicle control unit.

The present disclosure has the following advantageous effects.

The auxiliary parking brake controller is provided as a spare parking brake controller and is also integrated into the motor control unit, a hard wire is added as a spare communication channel between the auxiliary parking brake controller and the vehicle control unit, to realize controller duplexing and CAN communication duplexing of the EPB system and improve the fail-safe performance of the EPB system without significantly increasing the hardware cost.

It is possible to additionally ensure the transmission of CAN signals between the vehicle control unit and the main parking brake controller by providing a dual CAN communication channel between the vehicle control unit and the main parking brake controller.

The auxiliary parking brake controller is configured to perform auxiliary parking brake control by controlling the operation of only one caliper, effectively reducing the software capacity/controller volume while meeting the safety requirements of relevant laws and regulations.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
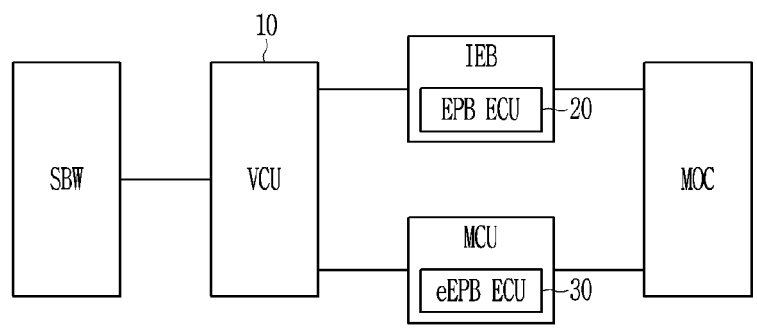
FIG. 1 is a schematic diagram illustrating an electrical parking brake system according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various exemplary embodiments of the present disclosure, and examples of the various exemplary embodiments are shown in the accompanying drawings and described below. Although the present disclosure will be described in conjunction with exemplary embodiments of the present disclosure, it will be understood that the present specification is not intended to limit the present disclosure to the exemplary embodiments of the present disclosure described. Furthermore, the present disclosure covers not only exemplary embodiments of the present disclosure, but also various alternative embodiments, modifications, equivalents, and other embodiments which may be included within the spirit and scope of the present disclosure, which is limited by the appended patent claims.

It should be understood that when one device is said to be "connected" to another, one device may be directly or indirectly connected to the other, and indirect connections include being "connected" through a wireless communication network.

It should be understood that the use of "including" in exemplary embodiments describes the presence of the above features, figures, steps, operations, elements, and/or assemblies, but does not preclude the presence or addition of one or more other features, figures, steps, operations, elements, and/or combinations thereof.

It should be understood that although the terms "first", "second", and the like. Are used in the present sentence to describe each element, these elements should not be limited by these terms.

In the following sentences, the working principles and exemplary embodiments of the present disclosure will be described in detail with reference to the accompanying drawings.

FIG. 1 is a schematic diagram illustrating an electrical parking brake system according to an exemplary embodiment of the present disclosure.

Figure 2:
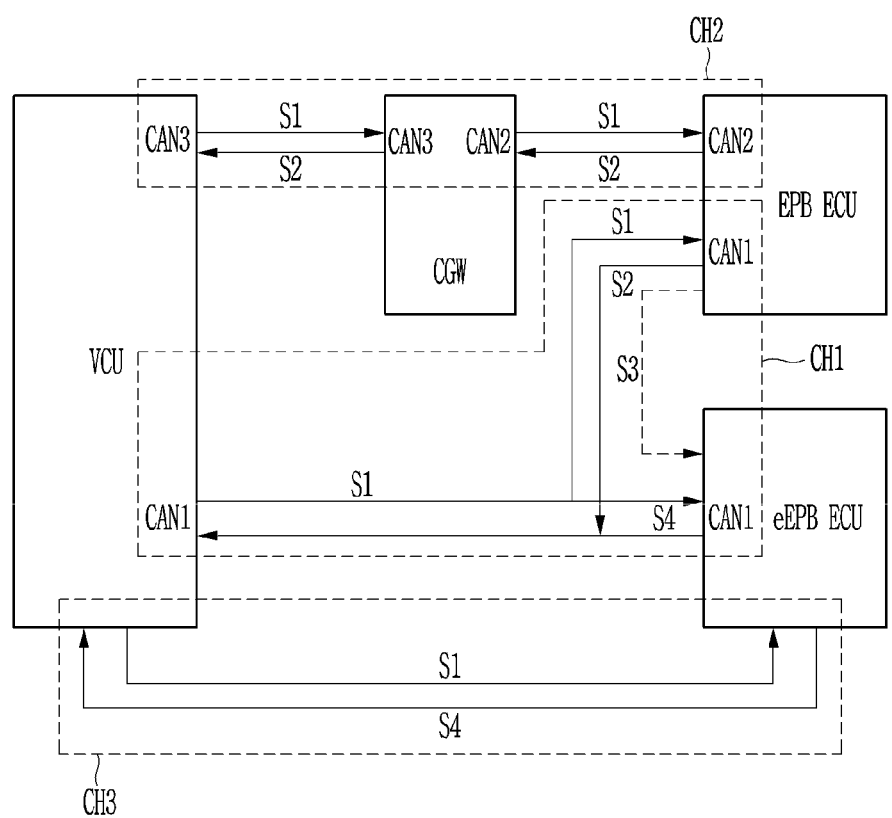
FIG. 2 is a schematic diagram illustrating communication channels and transmission signals of an electrical parking brake system according to an exemplary embodiment of the present disclosure.

FIG. 2 is a schematic diagram illustrating communication channels and transmission signals of an electrical parking brake system according to an exemplary embodiment of the present disclosure.

As shown in FIG. 1 and FIG. 2, an electrical parking brake system according to an exemplary embodiment of the present disclosure includes a Vehicle Control Unit (VCU) 10, a main Electronic Parking Brake Electronic Control Unit (EPB ECU) 20, and an auxiliary Electronic Parking Brake Electronic Control Unit (eEPB ECU) 30.

The VCU 10 is electrically connected to a Shift By Wire (SBW) of a vehicle, is configured to receive a shift command entered by a driver from the shift by wire, and periodically transmits a parking request signal S1 at a predetermined transmission time interval T1. The EPB ECU 20 is electrically connected to the VCU 10 through a first communication channel CH1 and a second communication channel CH2, and is configured to execute a main parking brake control based on the parking request signal S1 received from the VCU 10. The eEPB ECU 30 is electrically connected to the VCU 10 through the first communication channel CH1 and a third communication channel CH3, and is configured to execute an auxiliary parking brake control based on the parking request signal S1 received from the VCU 10. Here, the EPB ECU 20 and the eEPB ECU 30 are each integrated with an EPB software, that is, a Parking Brake Control (PBC) program.

The predetermined transmission time interval T1 is for example, but not limited to, 10 ms.

When the electrical parking brake system according to the exemplary embodiment of the present disclosure executes the parking brake control, the VCU 10 may continuously transmit the parking request signal S1 to the EPB ECU 20 and the eEPB ECU 30 periodically at the predetermined transmission time interval T1. When the eEPB ECU 30 is in an inactive state, the eEPB ECU 30 does not receive the parking request signal S1 from the VCU 10.

According to the exemplary embodiment of the present disclosure, the first communication channel CH1 and the second communication channel CH2 are communication channels based on a Controller Area Network (CAN) network. For an electric vehicle EV, the first communication channel CH1 includes a first CAN local area network CAN1 of the CAN network, and the second communication channel CH2 includes a second CAN local area network CAN2, a third CAN local area network CAN3, and a Center Gate Way (CGW) of the CAN network. For example, the first CAN local area network CAN1 may be a first powertrain CAN local area network, the second CAN local area network CAN2 may be a chassis control CAN local area network, the third CAN local area network CAN3 may be a second powertrain CAN local area network, and the Center Gate Way CGW is used to transmit signals between CAN local area networks to realize interconnection between the local area networks.

According to the exemplary embodiment of the present disclosure, the EPB ECU 20 may be integrated into an IEB unit of the vehicle, and the eEPB ECU 30 may be integrated into a Motor Control Unit (MCU) of the vehicle, but the present disclosure is not limited thereto. According to the CAN network architecture of an existing electric vehicle EV, the VCU belongs to the first CAN local area network CAN1 and the third CAN local area network CAN3, the MCU belongs to the first CAN local area network CAN1, and the IEB unit belongs to the first CAN local area network CAN1 and the second CAN local area network CAN2. In other exemplary embodiments of the present disclosure, the eEPB ECU 30 may also be integrated into another controller on the first CAN local area network CAN1 other than the MCU. Alternatively, in another exemplary embodiment of the present disclosure, the eEPB ECU 30 may also be integrated into another controller of the second CAN local area network CAN2 or the third CAN local area network CAN3, provided that the auxiliary parking brake controller is configured for communicating with the VCU and the IEB through the CAN local area network and the central gateway CGW.

Furthermore, the third communication channel CH3 is a communication channel based on a hard-wired connection. According to the exemplary embodiment of the present disclosure, the eEPB ECU 30 and the VCU 10 are each provided with one or more pins PIN, so that the hard-wired connection may be implemented between the eEPB ECU 30 and the VCU 10.

According to the exemplary embodiment of the present disclosure, when a shift command (for instance, a P-gear stage command) entered by the driver is received, the VCU 10 periodically transmits the parking request signal S1 to both the first communication channel CH1 and the second communication channel CH2 at the predetermined transmission time interval T1 at the same time.

According to the exemplary embodiment of the present disclosure, when the shift command entered by the driver is received, the VCU 10 periodically transmits the parking request signal S1 to the EPB ECU 20 through both the first communication channel CH1 and the second communication channel CH2 at the predetermined transmission time interval T1 to cause the EPB ECU 20 to execute the main parking brake control. The VCU 10 transmits the parking request signal S1 to the EPB ECU 20 through the first CAN local area network CAN1, and at the same time, the VCU 10 sequentially transmits the parking request signal S1 to the EPB ECU 20 through the third CAN local area network CAN3, the central gateway CGW, and the second CAN local area network CAN2. Thus, by realizing a dual CAN communication between the VCU 10 and the EPB ECU 20, the problem that the parking request signal S1 cannot be transmitted from the VCU 10 to the EPB ECU 20 in the event of a network failure in the first CAN local area network CAN1 only is prevented.

At the same time, the VCU 10 periodically receives a main parking brake status feedback signal S2, which indicates the execution status of the EPB ECU 20, from the EPB ECU 20 at a predetermined reception time interval T2. When the main parking brake status feedback signal S2 is not received from the EPB ECU 20 within the predetermined reception time interval (for example, the reception time interval T2), the VCU 10 is configured to determine that a communication failure has occurred in both the first communication channel CH1 (including the first CAN local area network CAN1) and the second communication channel CH2 (including the third CAN local area network CAN3, the central gateway, and the second CAN local area network CAN2). The main parking brake status feedback signal S2 includes a signal indicating that the Motor On Caliper (MOC) is locked, a signal indicating that the caliper is unlocked, a signal indicating that the caliper is moving, and a signal indicating an undefined state. That is, when none of the signals indicating that the caliper is locked, the signal indicating that the caliper is unlocked, the signal indicating that the caliper is moving, and the signal indicating an undefined state is received from the EPB ECU 20 within the predetermined reception time interval, the VCU 10 is configured to determine that the network failure has occurred in both the first communication channel CH1 and the second communication channel CH2, that is, the network failure has occurred in the CAN network. In the instant case, the VCU 10 switches the communication channel from the first communication channel CH1 and the second communication channel CH2 to the third communication channel CH3, which is a spare communication channel. In other words, according to the exemplary embodiment of the present disclosure, by implementing the CAN communication duplexing in the EPB system, the fail-safe performance of the EPB system is improved. Here, the predetermined reception time interval T2 is for example, but not limited to, 50 ms.

When the network failure occurs in the CAN network, the VCU 10 periodically transmits the parking request signal S1 to the eEPB ECU 30 at the predetermined transmission time interval T1 through the third communication channel CH3, activating the eEPB ECU 30 and causing the eEPB ECU 30 to execute the auxiliary parking brake control. In the exemplary embodiment of the present disclosure, an initial state of the eEPB ECU 30 is an inactive state. When the eEPB ECU 30 is activated, the eEPB ECU 30 begins to receive the parking request signal S1 from the VCU 10.

Furthermore, when the main parking brake status feedback signal S2 is received from the EPB ECU 20 within the predetermined reception time interval, the VCU 10 is configured to determine that at least one of the first communication channel CH1 (including the first CAN local area network CAN1) and the second communication channel CH2 (including the third CAN local area network CAN3, the central gateway, and the second CAN local area network CAN2) is a normal state, and maintains the transmission of the parking request signal S1 to the EPB ECU 20 through both the first communication channel CH1 and the second communication channel CH2. When any one of the signal indicating that the caliper is locked, the signal indicating that the caliper is unlocked, the signal indicating that the caliper is moving, and the signal indicating an undefined state is received from the EPB ECU 20 within the predetermined reception time interval, the VCU 10 is configured to determine that the at least one of the first communication channel CH1 and the second communication channel CH2 is in a normal state. At the instant time, when the parking request signal S1 is received from the VCU 10, the EPB ECU 20 may execute the main parking brake control.

However, when the EPB ECU 20 determines that the main parking brake control is not possible (that is, the EPB ECU 20 or the connector of the EPB ECU 20 is broken), the EPB ECU 20 transmits an auxiliary parking brake mode request signal S3 to the eEPB ECU 30 through the first communication channel CH1 to activate the eEPB ECU 30. In the instant case, the eEPB ECU 30 begins to receive the parking request signal S1 from the VCU 10.

The VCU 10 periodically transmits the parking request signal S1 to the eEPB ECU 30 at the predetermined transmission time interval T1 through the first communication channel CH1 to cause the eEPB ECU 30 to execute the auxiliary parking brake control, and periodically receives an auxiliary parking brake status feedback signal S4 indicating the execution status of the eEPB ECU 30 from the eEPB ECU 30 at the predetermined reception time interval T2. When the auxiliary parking brake status feedback signal S4 is received from the eEPB ECU 30 within the predetermined reception time interval, the VCU 10 is configured to determine that the first communication channel CH1 is the normal state, and cause the eEPB ECU 30 to maintain the execution of the auxiliary parking brake control. The auxiliary parking brake status feedback signal S4 includes the signal indicating that the caliper is locked, the signal indicating that the caliper is unlocked, the signal indicating that the caliper is moving, and the signal indicating the undefined state. That is, when any one of the signal indicating that the caliper is locked, the signal indicating that the caliper is unlocked, the signal indicating that the caliper is moving, and the signal indicating the undefined state is received from the eEPB ECU 30 within the predetermined reception time interval, the VCU 10 is configured to determine that the first communication channel CH1 is the normal state. In the instant case, the VCU 10 causes the eEPB ECU 30 to maintain the execution of the auxiliary parking brake control.

Furthermore, when the auxiliary parking brake status feedback signal S4 is not received from the eEPB ECU 30 within the predetermined reception time interval, the VCU 10 is configured to determine that the first communication channel CH1 includes a communication failure and the second communication channel CH2 is the normal state. In the instant case, the EPB ECU 20 cannot transmit the auxiliary parking brake mode request signal S3 (the request signal S3 is for activating the eEPB ECU 30) to the eEPB ECU 30 through the first communication channel CH1. In the instant case, the VCU 10 may periodically transmit the parking request signal S1 to the eEPB ECU 30 at the predetermined transmission time interval T1 through the third communication channel CH3, activating the eEPB ECU 30 and causing the eEPB ECU 30 to execute the auxiliary parking brake control.

According to the exemplary embodiment of the present disclosure, when the parking request signal S1 is received from the VCU 10, and when the EPB ECU 20 is configured to determine that the main parking brake control is executable, the EPB ECU 20 is configured to control the operation of both calipers to execute the main parking brake control. Furthermore, after the main parking brake control is completed, the EPB ECU 20 transmits the main parking brake status feedback signal S2 indicating that the main parking brake control is completed to the VCU 10. Here, the main parking brake status feedback signal S2 indicating that the main parking brake control is completed includes the signal indicating that the caliper is locked and the signal indicating that the caliper is unlocked.

Furthermore, it is possible to effectively reduce a software capacity/controller volume by controlling only one caliper rather than controlling both the calipers, provided that safety requirements for fully loaded parking on a ramp with an 8% slope stipulated by relevant laws and regulations are met. Thus, according to the exemplary embodiment of the present disclosure, when the eEPB ECU 30 executes the auxiliary parking brake control, the eEPB ECU 30 may execute the auxiliary parking brake control by controlling the operation of only one caliper. Furthermore, after the auxiliary parking brake control is completed, the eEPB ECU 30 may transmit the auxiliary parking brake status feedback signal S4 indicating that the auxiliary parking brake control is completed to the VCU 10. Here, the auxiliary parking brake status feedback signal S4 indicating that the auxiliary parking brake control is completed includes the signal indicating that the caliper is locked and the signal indicating that the caliper is unlocked. According to an exemplary embodiment of the present disclosure, the controller duplexing of the EPB system is realized by integrating the auxiliary parking brake controller into the MCU as a spare parking brake controller, improving the fail-safe performance of the EPB system without additional hardware costs.

When the VCU 10 receives the main parking brake status feedback signal S2 indicating that the main parking brake control is completed or the auxiliary parking brake status feedback signal S4 indicating that the auxiliary parking brake control is completed, the VCU 10 may transmit a signal indicating a current gear to the dashboard for display.

Figure 3:
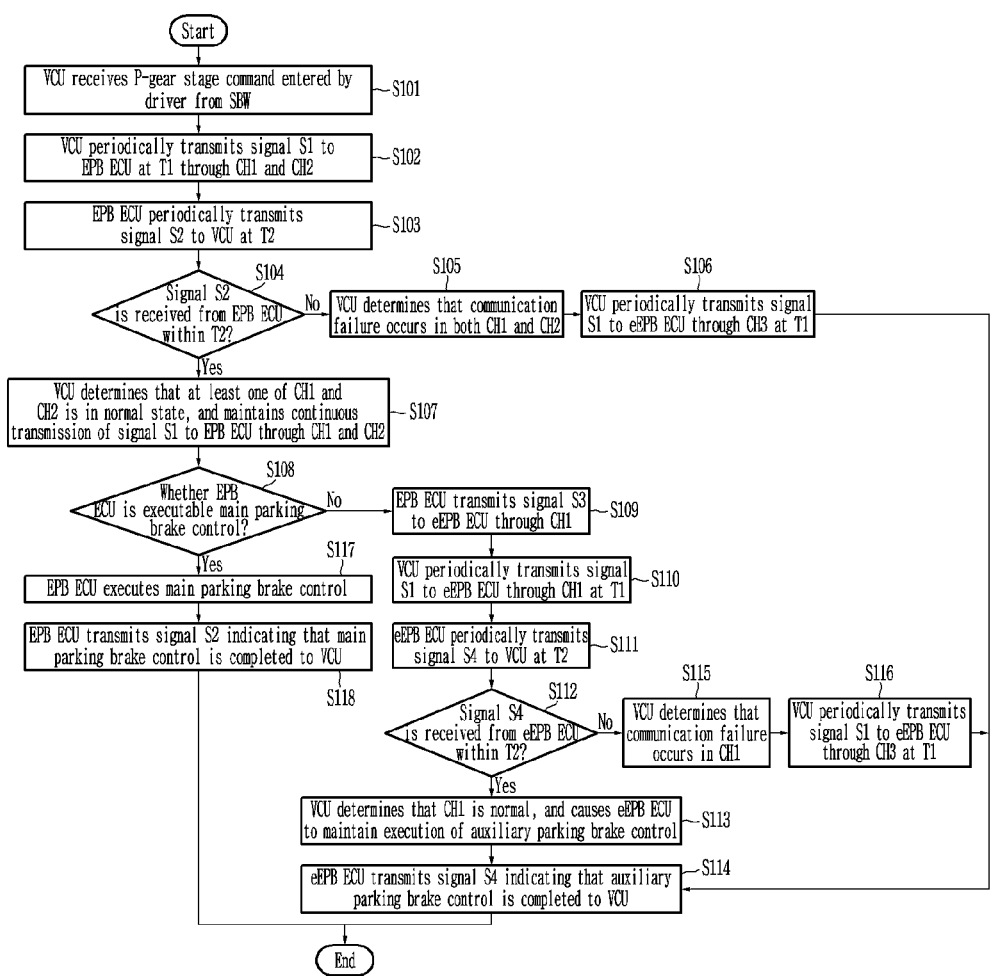
FIG. 3 is a flow diagram illustrating a control method of an electrical parking brake system according to an exemplary embodiment of the present disclosure.

Hereinafter, a control method of the electrical parking brake system according to an exemplary embodiment of the present disclosure will be described in detail with reference to FIG. 3. FIG. 3 is a flow diagram illustrating a control method of the electrical parking brake system according to the exemplary embodiment of the present disclosure.

In step S101, the VCU 10 receives the shift command (specifically, the P-gear stage command) entered by the driver from the SBW.

In step S102, the VCU 10 periodically transmits the parking request signal S1 to the EPB ECU 20 through both the first communication channel CH1 and the second communication channel CH2 at the predetermined transmission time interval T1 to cause the EPB ECU 20 to execute the main parking brake control.

In step S103, the EPB ECU 20 periodically transmits the main parking brake status feedback signal S2 to the VCU 10 at the predetermined reception time interval T2.

In step S104, the VCU 10 is configured to determine whether the main parking brake status feedback signal S2 has been received from the EPB ECU 20 within the predetermined reception time interval.

When the main parking brake status feedback signal S2 is not received from the EPB ECU 20 within the predetermined reception time interval ("No" in the step S104), in step S105, the VCU 10 is configured to determine that the communication failure has occurred in both the first communication channel CH1 and the second communication channel CH2.

In step S106, the VCU 10 periodically transmits the parking request signal S1 to the eEPB ECU 30 at the predetermined transmission time interval T1 through the third communication channel CH3, activating the eEPB ECU 30 and causing the eEPB ECU 30 to execute the auxiliary parking brake control.

When the main parking brake status feedback signal S2 is received from the EPB ECU 20 within the predetermined reception time interval ("Yes" in the step S104), in step S107, the VCU 10 is configured to determine that the at least one of the first communication channel CH1 and the second communication channel CH2 is in the normal state, and maintains the transmission of the parking request signal S1 to the EPB ECU 20 through both the first communication channel CH1 and the second communication channel CH2.

In step S108, the EPB ECU 20 is configured to determine whether the main parking brake control is executable.

When it is determined that the main parking brake control cannot be executed ("No" in the step S108), in step S109, the EPB ECU 20 transmits the auxiliary parking brake mode request signal S3 to the eEPB ECU 30 through the first communication channel CH1 to activate the eEPB ECU 30.

In step S110, the VCU 10 periodically transmits the parking request signal S1 to the eEPB ECU 30 at the predetermined transmission time interval T1 through the first communication channel CH1 to cause the eEPB ECU 30 to execute the auxiliary parking brake control.

In step S111, the eEPB ECU 30 periodically transmits the auxiliary parking brake status feedback signal S4 to the VCU 10 at the predetermined reception time interval T2.

In step S112, the VCU 10 is configured to determine whether the auxiliary parking brake status feedback signal S4 is received from the eEPB ECU 30 within the predetermined reception time interval.

When the auxiliary parking brake status feedback signal S4 is received from the eEPB ECU 30 within the predetermined reception time interval ("Yes" in the step S112), in step S113, the VCU 10 is configured to determine that the first communication channel CH1 is the normal state, and causes the eEPB ECU 30 to maintain the execution of the auxiliary parking brake control.

In operation S114, the eEPB ECU 30 transmits the auxiliary parking brake status feedback signal S4 indicating that the auxiliary parking brake control has been completed to the VCU 10.

When the auxiliary parking brake status feedback signal S4 is not received from the eEPB ECU 30 within the predetermined reception time interval ("No" in the step S112), in step S115, the VCU 10 is configured to determine that the communication failure has occurred in the first communication channel CH1.

In step S116, the VCU 10 periodically transmits the parking request signal S1 to the eEPB ECU 30 at the predetermined transmission time interval T1 through the third communication channel CH3, activating the eEPB ECU 30 and causing the eEPB ECU 30 to execute the auxiliary parking brake control.

When it is determined that the main parking brake control is possible ("Yes" in the step S108), in step S117, the EPB ECU 20 executes the main parking brake control.

In step S118, the EPB ECU 20 transmits the main parking brake status feedback signal S2 indicating that the main parking brake control has been completed to the VCU 10.

The electrical parking brake system and the control method thereof included in the above-described exemplary embodiments of the present disclosure may realize the controller duplexing and the CAN communication duplexing of the EPB system simultaneously by integrating the auxiliary parking brake controller into the MCU as the spare parking brake controller, and adding the hard wire which is the spare communication channel between the auxiliary parking brake controller and the VCU. Thus, the fail-safe performance of the EPB system is improved without significantly increasing the hardware cost.

Although the present disclosure is described with reference to the Electric Vehicle (EV), the present application scenario should not be used as a limitation to the present disclosure, and those skilled in the art may adapt the present disclosure to other application scenarios. For example, the present disclosure may be applied to any other vehicle, such as traditional fuel vehicles, Hybrid Electric Vehicles (HEVs), with both an electrical parking brake system and an electronic transmission mechanism. For an existing fuel vehicle, the VCU may be the VCU of an existing fuel vehicle, the IEB may be the ESC unit, and the MCU may be the Transmission Control Unit (TCU). For a hybrid electric vehicle, the VCU may be the VCU of the hybrid electric vehicle, the IEB may be the ESC unit, and the MC may be the MCU of the hybrid electric vehicle.

Also, for the existing fuel vehicles, Hybrid Electric Vehicles (HEVs), a first communication channel CH1 includes a first CAN local area network CAN1 of a CAN network, and a second communication channel CH2 includes a second CAN local area network CAN2, a first CAN local area network CAN1, and a Center Gate Way CGW of the CAN network. In the instant case, the first CAN local area network CAN1 may be a powertrain CAN local area network, and the second CAN local area network CAN2 may be a chassis control CAN local area network. In the instant case, when a shift command entered by a driver is received, the VCU 10 periodically transmits a parking request signal S1 to the EPB ECU 20 through both the first communication channel CH1 and the second communication channel CH2 at a predetermined transmission time interval T1 to realize dual CAN communication between the VCU 10 and the EPB ECU 20. Thus, the problem is prevented that the parking request signal S1 cannot be transmitted from the VCU 10 to the EPB ECU 20 in the event of a network failure in the second CAN local area network (CAN2) only.

The exemplary methods of the present disclosure described above are expressed as a series of controls for clarity of description, but are not intended to limit the order in which the operations are executed, and each operation may be executed simultaneously or in a different order as required. To practice the method according to an exemplary embodiment of the present disclosure, the illustrated operations may include other operations, and may include some operations except for some operations, or may include other additional operations except for some operations.

Furthermore, various exemplary embodiments of the present disclosure may be implemented by hardware, firmware, software, or combinations thereof. The hardware may be implemented as one or more selected from an Application-Specific Integrated Circuit (ASIC), Digital Signal Processor (DSP), Digital Signal Processing Device (DSPD), Programmable Logic Device (PLD), Field Programmable Gate Array (FPGA), General Purpose Processor, controller, microcontroller, microprocessor, and the like.

The scope of the present disclosure includes software or machine-executable instructions (for example, control systems, application programs, firmware, and programs) and non-transitory computer-readable media, and the software or machine-executable instructions cause the controls according to various exemplary embodiments to be executed on a device or computer, and the non-transitory computer-readable media are executable on a device or computer on which such software or instructions are stored.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An electrical parking brake system comprising:
   a vehicle control unit electrically connected to a shift by wire of a vehicle, and configured to receive a shift command entered by a driver from the shift by wire, and periodically transmitting a parking request signal at a predetermined transmission time interval;
   a main parking brake controller electrically connected to the vehicle control unit through a first communication channel and a second communication channel, and configured to execute a main parking brake control based on the parking request signal received from the vehicle control unit; and
   an auxiliary parking brake controller electrically connected to the vehicle control unit through the first communication channel and a third communication channel, and configured to execute an auxiliary parking brake control based on the parking request signal received from the vehicle control unit.

2. The electrical parking brake system of claim 1, wherein the main parking brake controller is integrated into an integral electrical brake unit of the vehicle, and the auxiliary parking brake controller is integrated into a motor control unit of the vehicle.

3. The electrical parking brake system of claim 1,
   wherein the first communication channel includes a first CAN local area network of a CAN network,
   wherein the second communication channel includes a second CAN local area network, a third CAN local area network, and a central gateway of the CAN network, and
   wherein the third communication channel is a communication channel based on a hardwired connection.

4. The electrical parking brake system of claim 1, wherein the vehicle control unit is further configured to:
   in response that the shift command entered by the driver is received, transmit the parking request signal to the main parking brake controller through the first communication channel and the second communication channel to cause the main parking brake controller to execute the main parking brake control, and
   periodically receive a main parking brake status feedback signal from the main parking brake controller at a predetermined reception time interval.

5. The electrical parking brake system of claim 4, wherein the vehicle control unit is further configured to:
   in response that the main parking brake status feedback signal is not received from the main parking brake controller within the predetermined reception time interval, conclude that a communication failure has occurred in both the first communication channel and the second communication channel, and
   transmit the parking request signal to the auxiliary parking brake controller through the third communication channel and activate the auxiliary parking brake controller to cause the auxiliary parking brake controller to execute the auxiliary parking brake control.

6. The electrical parking brake system of claim 5, wherein the auxiliary parking brake controller is configured to:
   execute the auxiliary parking brake control by controlling an operation of one caliper, and
   after the auxiliary parking brake control is completed, transmit an auxiliary parking brake status feedback signal indicating that the auxiliary parking brake control is completed to the vehicle control unit.

7. The electrical parking brake system of claim 4, wherein the vehicle control unit is further configured to:
   in response that the main parking brake status feedback signal is received from the main parking brake controller within the predetermined reception time interval, conclude that at least one of the first communication channel and the second communication channel is in a normal state, and maintain the transmission of the parking request signal to the main parking brake controller through both the first communication channel and the second communication channel.

8. The electrical parking brake system of claim 7, wherein the main parking brake controller is further configured to:
   in response that the parking request signal is received from the vehicle control unit, determine whether the main parking brake control is executable, and in response that the main parking brake controller concludes that the main parking brake control cannot be executed, transmit an auxiliary parking brake mode request signal to the auxiliary parking brake controller through the first communication channel and activate the auxiliary parking brake controller.

9. The electrical parking brake system of claim 8, wherein the vehicle control unit is further configured to:
   in response that the auxiliary parking brake controller is activated, transmit the parking request signal to the auxiliary parking brake controller through the first communication channel to cause the auxiliary parking brake controller to execute the auxiliary parking brake control,
   receive an auxiliary parking brake status feedback signal from the auxiliary parking brake controller periodically at the predetermined reception time interval, and
   in response that the auxiliary parking brake status feedback signal is received from the auxiliary parking brake controller within the predetermined reception time interval, conclude that the first communication channel is in a normal state, and cause the auxiliary parking brake controller to maintain the execution of the auxiliary parking brake control.

10. The electrical parking brake system of claim 9, wherein the vehicle control unit is further configured to:
    in response that the auxiliary parking brake status feedback signal is not received from the auxiliary parking brake controller within the predetermined reception time interval, conclude that a communication failure has occurred in the first communication channel, and
    transmit the parking request signal to the auxiliary parking brake controller through the third communication channel and activate the auxiliary parking brake controller to cause the auxiliary parking brake controller to execute the auxiliary parking brake control.

11. The electrical parking brake system of claim 7, wherein the main parking brake controller is further configured to:
    in response that the parking request signal is received from the vehicle control unit, determine whether the main parking brake control is executable, in response that the main parking brake controller concludes that the main parking brake control is executable, control operations of first and second calipers to execute the main parking brake control, and after the main parking brake control is completed, transmit a main parking brake status feedback signal indicating that main parking brake control has been completed to the vehicle control unit.

12. A control method of an electrical parking brake system, wherein the electrical parking brake system including a vehicle control unit, a main parking brake controller, and an auxiliary parking brake controller, the main parking brake controller being electrically connected to the vehicle control unit through a first communication channel and a second communication channel, and the auxiliary parking brake controller being electrically connected to the vehicle control unit through the first communication channel and a third communication channel,
wherein the control method comprises:
receiving, by the vehicle control unit, a shift command entered by a driver from a shift by wire, and periodically transmitting a parking request signal at a predetermined transmission time interval;
executing, by the main parking brake controller, a main parking brake control based on the parking request signal received from the vehicle control unit; and
executing, by the auxiliary parking brake controller, an auxiliary parking brake control based on the parking request signal received from the vehicle control unit.

13. The control method of claim 12,
wherein the main parking brake controller is integrated into an integral electrical brake unit of the vehicle, and the auxiliary parking brake controller is integrated into a motor control unit of the vehicle, and
wherein the first communication channel includes a first CAN local area network of a CAN network, the second communication channel includes a second CAN local area network, a third CAN local area network, and a central gateway of the CAN network, and the third communication channel is a communication channel based on a hardwired connection.

14. The control method of claim 12, wherein:
in response that the shift command entered by the driver is received, the vehicle control unit is configured to transmit the parking request signal to the main parking brake controller through both the first communication channel and the second communication channel to cause the main parking brake controller to execute the main parking brake control, and
the vehicle control unit periodically receives a main parking brake status feedback signal from the main parking brake controller at a predetermined reception time interval.

15. The control method of claim 14, wherein:
in response that the main parking brake status feedback signal is not received from the main parking brake controller within the predetermined reception time interval, the vehicle control unit is configured to determine that a communication failure has occurred in both the first communication channel and the second communication channel, and
the vehicle control unit is configured to transmit the parking request signal to the auxiliary parking brake controller through the third communication channel and activates the auxiliary parking brake controller to cause the auxiliary parking brake controller to execute the auxiliary parking brake control.

16. The control method of claim 15, wherein:
the auxiliary parking brake controller is configured to execute the auxiliary parking brake control by controlling an operation of one caliper, and after the auxiliary parking brake control is completed, the auxiliary parking brake controller is configured to transmit an auxiliary parking brake status feedback signal indicating that the auxiliary parking brake control is completed to the vehicle control unit.

17. The control method of claim 14, wherein:
in response that the main parking brake status feedback signal is received from the main parking brake controller within the predetermined reception time interval, the vehicle control unit is configured to conclude that at least one of the first communication channel and the second communication channel is in a normal state, and maintains the transmission of the parking request signal to the main parking brake controller through both the first communication channel and the second communication channel.

18. The control method of claim 17, wherein:
in response that the parking request signal is received from the vehicle control unit, the main parking brake controller is configured to determine whether the main parking brake control is executable, and in response that the main parking brake controller concludes that the main parking brake control cannot be executed, the main parking brake controller is configured to transmit an auxiliary parking brake mode request signal to the auxiliary parking brake controller through the first communication channel to activate the auxiliary parking brake controller,
the vehicle control unit is configured to transmit the parking request signal to the auxiliary parking brake controller through the first communication channel to cause the auxiliary parking brake controller to execute the auxiliary parking brake control,
the vehicle control unit is configured to receive an auxiliary parking brake status feedback signal from the auxiliary parking brake controller periodically at the predetermined reception time interval, and
in response that the auxiliary parking brake status feedback signal is received from the auxiliary parking brake controller within the predetermined reception time interval, the vehicle control unit is configured to conclude that the first communication channel is in a normal state, and causes the auxiliary parking brake controller to maintain the execution of the auxiliary parking brake control.

19. The control method of claim 18, wherein:
in response that the auxiliary parking brake status feedback signal is not received from the auxiliary parking brake controller within the predetermined reception time interval, the vehicle control unit is configured to determine that the communication failure has occurred in the first communication channel, and
the vehicle control unit is configured to transmit the parking request signal to the auxiliary parking brake controller through the third communication channel and activates the auxiliary parking brake controller to cause the auxiliary parking brake controller to execute the auxiliary parking brake control.

20. The control method of claim 17, wherein:
in response that the parking request signal is received from the vehicle control unit, the main parking brake controller is configured to determine whether the main parking brake control is executable;
in response that the main parking brake controller concludes that the main parking brake control is executable, the main parking brake controller is configured to control operations of first and second calipers to execute the main parking brake control; and after the main parking brake control is completed, the main parking brake controller is configured to transmit the main parking brake status feedback signal indicating that the main parking brake control is completed to the vehicle control unit.

* * * * *